(12) United States Patent
Kim

(10) Patent No.: US 7,520,639 B2
(45) Date of Patent: Apr. 21, 2009

(54) BACKLIGHT UNIT AND LIQUID CRYSTAL DISPLAY USING THE SAME

(75) Inventor: Kyung Il Kim, Gyeonggi-do (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 11/823,806

(22) Filed: Jun. 27, 2007

(65) Prior Publication Data

US 2008/0043169 A1    Feb. 21, 2008

(30) Foreign Application Priority Data

Jun. 30, 2006  (KR) .................... 10-2006-0061073

(51) Int. Cl.
*F21V 29/00*  (2006.01)

(52) U.S. Cl. .................. 362/294; 362/615; 362/373

(58) Field of Classification Search ............. 362/615, 362/294, 373
See application file for complete search history.

(56) References Cited

U.S. PATENT DOCUMENTS

| 6,991,356 | B2* | 1/2006 | Tsimerman et al. | 362/573 |
| 7,226,184 | B2* | 6/2007 | Takahashi | 362/218 |
| 7,273,310 | B2* | 9/2007 | Chen | 362/580 |
| 2003/0123258 | A1* | 7/2003 | Nitto et al. | 362/373 |
| 2007/0279921 | A1* | 12/2007 | Alexander et al. | 362/368 |

* cited by examiner

*Primary Examiner*—Thomas M Sember
(74) *Attorney, Agent, or Firm*—Brinks Hofer Gilson & Lione

(57) ABSTRACT

A backlight unit is suitable for emitting uniform surface light. The backlight unit comprises a lamp emitting light to an incident light side of a light guide plate, and a lamp housing enclosing the lamp and including a heat sink.

8 Claims, 3 Drawing Sheets

BACKLIGHT UNIT AND LIQUID CRYSTAL DISPLAY USING THE SAME

The present application claims priority under 35 U.S.C. 119 to Korean Patent Application No. 10-2006-0061073, filed on Jun. 30, 2006, which is hereby incorporated by reference in its entirety.

BACKGROUND OF THE INVENTION

1. Field of the Invention

The present invention relates to a backlight unit emitting surface light, and a liquid crystal display using the same.

2. Description of the Related Art

In the recent information society, the emphasis has been put on the importance of display devices as visual information transfer media than ever. The cathode ray tubes, which are mostly used as the current display devices, have a problem in that they are heavy and bulky. The flat panel display devices such as plasma display devices, electro-luminescent display devices, liquid crystal displays (LCDs), etc. capable of the limits of the cathode ray tubes are being developed. Among these flat panel display devices, the LCDs show a tendency that their application fields are gradually increased due to the advantages of light weight, thin thickness, low-power-consumption driving, and so on.

These LCDs adjust an amount of transmitted light on the basis of image signals applied to a plurality of control switches arranged in a matrix pattern, thereby displaying an image corresponding to the image signal. At this time, a quantity of light transmitting the LCD is adjusted by orientation of liquid crystals in a liquid crystal panel, and thereby a gray scale is expressed.

The LCDs require a light source such as a backlight unit, because they are not spontaneous light-emitting display devices. The backlight unit for the LCDs is divided into a direct type and an edge type. The edge-type backlight unit comprises a light source and a light guide plate, which are disposed below the liquid crystal panel. The light guide plate guides light from the light source to the rear of the liquid crystal panel in a two-dimensional shape. Meanwhile, the direct-type backlight unit has a plurality of light sources disposed below the liquid crystal panel. The light sources emit light throughout the rear surface of the liquid crystal panel.

One of the light sources of the backlight unit includes a fluorescent lamp. The fluorescent lamp is classified as a cold cathode fluorescent lamp (CCFL) that is supplied with electric power through electrodes inserted into opposite ends of a glass tube, and an external electrode fluorescent lamp (EEFL) that is supplied with electric power through electrodes enclosing the outside of opposite ends of a glass tube using a metal material.

For example, the edge-type backlight unit using the fluorescent lamp is constructed as in FIG. 1. The edge-type backlight unit includes a fluorescent lamp 6 installed at one side (i.e. at an incident light side) of a light guide plate 2, and a lamp housing 4 enclosing the fluorescent lamp 6 such that only the incident light side of the light guide plate 2 is exposed. The light guide plate 2 causes the light from the fluorescent lamp 6 to travel through a surface thereof in a two-dimensional shape.

The lamp housing 4 reflects some of the light emitted from the fluorescent lamp 6 and traveling toward the side opposite to the incident light side of the light guide plate 2 toward the incident light side of the light guide plate 2, thereby increasing efficiency of the light of the backlight unit. In order to fully perform this function, the lamp housing 4 is produced so as to increase a quantity of light reflected toward the incident light side of the light guide plate 2 and simultaneously to decrease a quantity of light absorbed into the glass tube of the fluorescent lamp 6.

In this backlight unit, the fluorescent lamp 6 has no alternative but to be driven in a high temperature state due to heat generated by itself and a space closed by the lamp housing 4 and the light guide plate 2. Such a high temperature state (or condition) incurs reduction of light emitting efficiency and life span of the fluorescent lamp 6. Further, the high temperature state around the fluorescent lamp 6 locally changes the properties of optical sheets in the backlight unit including the light guide plate. For this reason, the surface light irradiated from the backlight unit is not uniform. In addition, the non-uniform surface light causes the brightness of an image displayed by the liquid crystal panel to become non-uniform. As a result, a quality of image displayed by the LCD is inevitably deteriorated.

SUMMARY OF THE INVENTION

Accordingly, the present invention is directed to a backlight unit that substantially obviates one or more of the problems due to limitations and disadvantages of the related art, and a liquid crystal display using the same.

An object of the present invention is to provide a backlight unit, which is suitable for emitting uniform surface light.

Another object of the present invention is to provide a liquid crystal display, which is suitable for displaying a good quality of image.

According to an aspect of the present invention, there is provided a backlight unit, which comprises a lamp emitting light to an incident light side of a light guide plate, and a lamp housing enclosing the lamp and including a heat sink.

According to another aspect of the present invention, there is provided a liquid crystal display, which comprises a liquid crystal panel, and a backlight unit including a light guide plate that guides light from a lamp to the liquid crystal panel in a two-dimensional shape, and a lamp housing enclosing the lamp and including a heat sink.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention together with the description, and serve to explain the principle of the invention.

DETAILED DESCRIPTION OF THE EMBODIMENTS ACCORDING TO THE INVENTION

Figure 1:
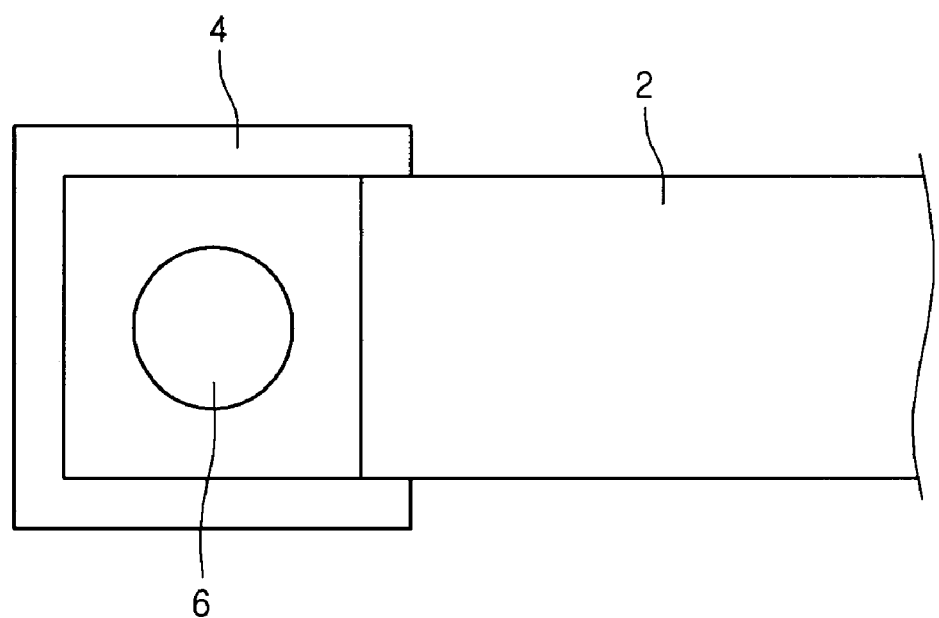
FIG. 1 is a sectional view illustrating a part of a backlight unit in the related art.

Hereinafter, exemplary embodiments of the present invention will be described with reference to the accompanying drawings. In the drawings, components having the same operations and functions are designated by the same reference numerals.

Figure 2:
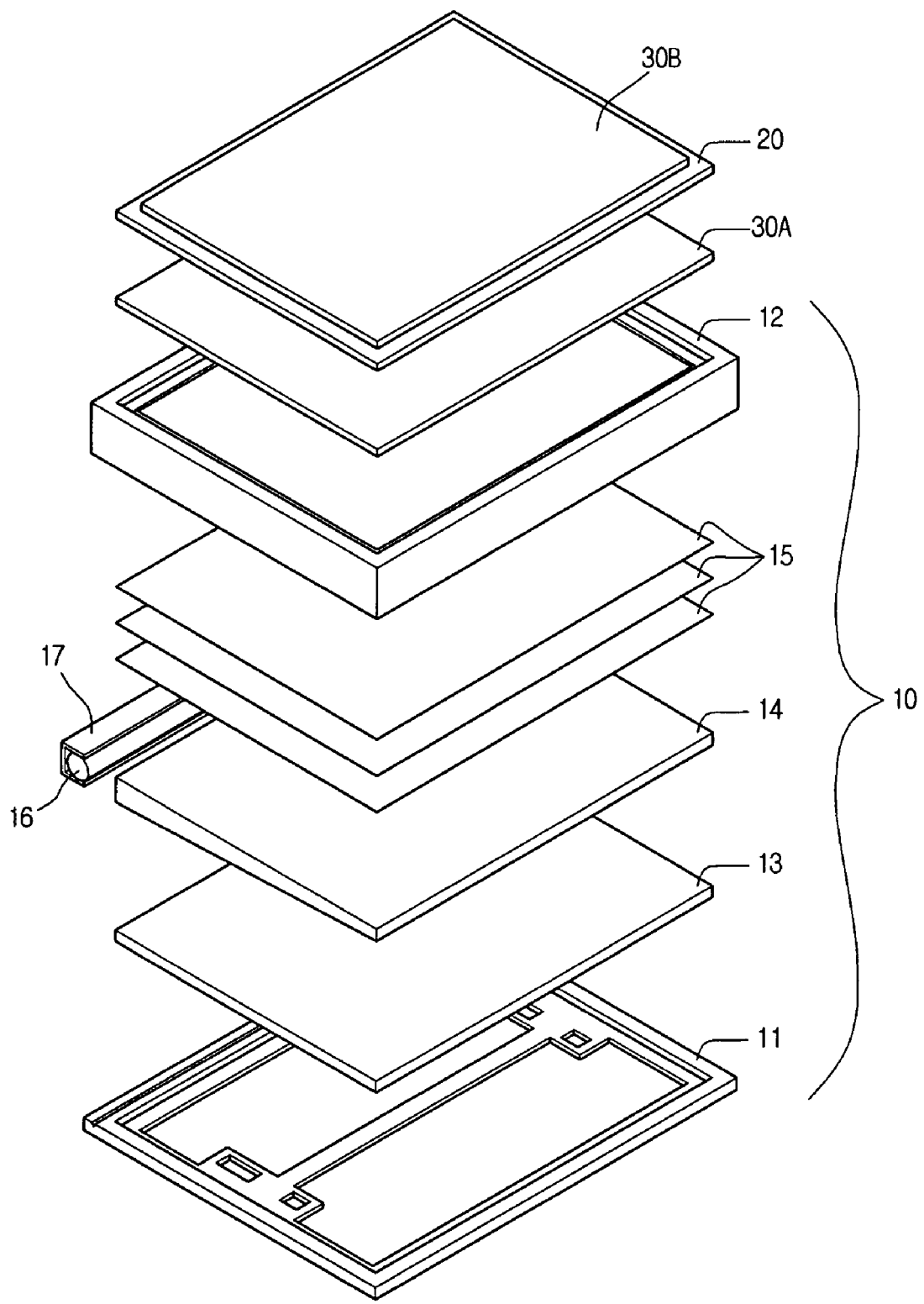
FIG. 2 is an exploded perspective view illustrating a liquid crystal display (LCD) having a backlight unit according to an embodiment of the present invention.

FIG. 2 is an exploded perspective view illustrating a liquid crystal display (LCD) having a backlight unit according to an embodiment of the present invention. Referring to FIG. 2, the LCD comprises a backlight unit 10, which irradiates light onto the rear of a liquid crystal panel 20. The liquid crystal panel 20 has a liquid crystal layer between upper and lower glass substrate. The liquid crystal layer is driven in each pixel region (i.e. each liquid crystal cell) by thin film transistors arranged in an active matrix pattern. Each thin film transistor switches a video signal (i.e. pixel data signal) to be supplied to the corresponding liquid crystal cell. This liquid crystal panel 20 has polarizing sheets 30A and 30B on front and rear surfaces thereof, respectively. The polarizing sheets 30A and 30B increase the viewing angle of an image displayed on the liquid crystal panel 20.

The backlight unit 10 includes a support main 12 fastened to the edge of a bottom cover 11. A reflection sheet 13, a light guide plate 14, and a set of optical sheets 15 are sequentially stacked in a space defined by the bottom cover 11 and the support main 12. The liquid crystal panel 20 having the polarizing sheets 30A and 30B on the opposite surfaces thereof is located on the support main 12. Consequently, the support main 12 supports the liquid crystal panel 20 and simultaneously receives and protects the reflection sheet 13, the light guide plate 14, and the optical sheet set 15. To the end, the support main 12 is made of a plastic molding. Meanwhile, the bottom cover 11 supports reflection sheet 13, the light guide plate 14, and the optical sheet set 15.

Further, the backlight unit 10 comprises a lamp 16 emitting light through a voltage or current signal from an external power supply, and a lamp housing 17 enclosing the lamp 16 together with an incident light side (i.e. one side) of the light guide plate 14. The lamp 16 and the lamp housing 17 are supported by the bottom cover 11, and are received and protected by the support main 12. The lamp 16 includes a cold cathode fluorescent lamp (CCFL) or an external electrode fluorescent lamp (EEFL).

The light guide plate 14 causes the light, which is incident from the lamp 16 through the incident light side thereof, to travel toward the liquid crystal panel 20 in a two-dimensional shape. To this end, the light guide plate 14 has a rear surface that is gradually inclined upwards from the incident light side thereof.

The reflection sheet 13 reflects the light, which travels toward the bottom cover 11 from the rear of the light guide plate 14, toward the light guide plate 14. The efficiency of the light of the backlight unit 10 is increased by the reflection sheet 13.

The optical sheet set 15 diffuses and collects the surface light traveling from the light guide plate 14 to the liquid crystal panel 20. The surface light is irradiated perpendicular to the rear surface of the liquid crystal panel 20 by the optical sheet set 15. To this end, the optical sheet set 15 has a diffusion sheet and a prism sheet.

The lamp housing 17 reflects the light from the lamp 16 to the incident light side of the light guide plate 14. Due to the lamp housing 17, the efficiency of the light of the backlight unit 10 is increased, whereas the loss of the light is minimized. In addition, the lamp housing 17 inhibits the temperature of the lamp 16 and its surrounds from being raised.

In this manner, as the temperature of the lamp 16 and its surrounds is inhibited from being raised by the lamp housing 17, the characteristics of the reflection sheet 13, the light guide plate 14, the optical sheet set 15, and the liquid crystal panel 20 are prevented from being changed in part, and especially the resistance characteristic of a metal material on the liquid crystal panel 20 is prevented from being changed. Thus, the surface light emitted from the backlight unit 10 becomes uniform and travels perpendicular to the rear surface of the liquid crystal panel.

In addition, the inhibition of the temperature of the lamp 16 and its surrounds not only prevents a resistance characteristic of metal in the liquid crystal panel from being changed, but also stabilizes characteristics of a semiconductor device such as a transistor that is sensitive to heat. The stabilization of the characteristics of the liquid crystal panel and the uniformity of the surface light can guarantee brightness uniformity of the image. As a result, the LCD can improve a quality of image.

Figure 3:
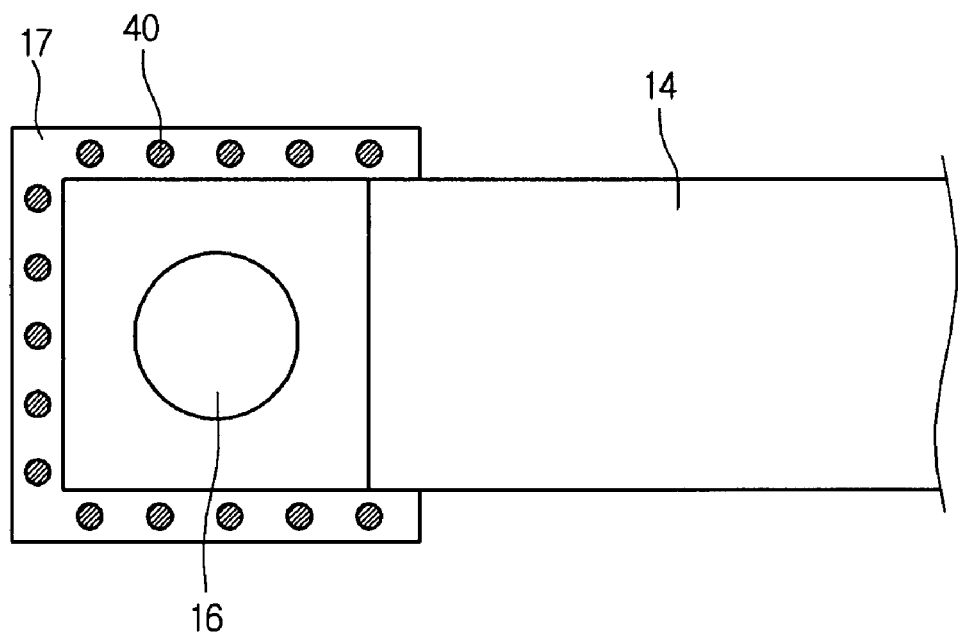
FIG. 3 is a partial sectional view illustrating a part of the backlight unit of FIG. 2.

FIG. 3 is a partial sectional view illustrating a part of an assembled structure including the light guide plate 14, the lamp 16, and the lamp housing 17) of the backlight unit 10 of FIG. 2.

Referring to the backlight unit 10 of FIG. 3, the lamp housing 17 has a cross section shape, which overlaps with upper and lower edges thereof at the incident light side of the light guide plate 14, and encloses the surroundings of the lamp 16. In this way, because the lamp housing 17 encloses the lamp 16 together with the incident light side (i.e. one side) of the light guide plate 14, the light emitted from the lamp 16 can be incident upon the incident light side of the light guide plate 14. Thus, the efficiency of the light of the lamp 16 is increased, and thus the efficiency of the light of the backlight unit 10 including the lamp is increased.

In addition, the lamp housing 17 absorbs heat radiating from the lamp 16 to inhibit the temperature of the lamp 16 and its surrounds from being raised. To this end, the lamp housing 17 includes a heat sink 40 absorbing the heat. Because the heat sink 40 absorbs the heat generated from the lamp 16, the temperature of the lamp 16 and its surrounds is inhibited under a predetermined critical temperature.

Figure 4:
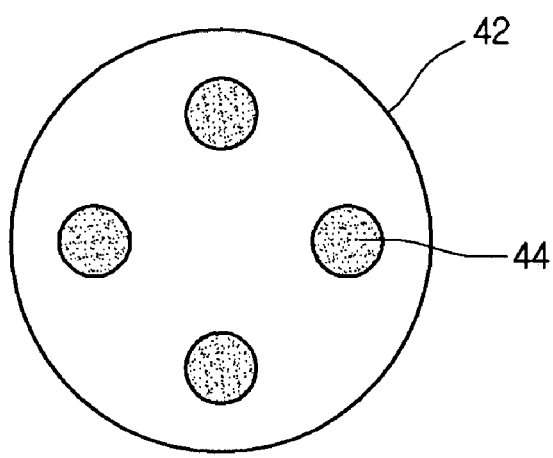
FIG. 4 is a sectional view illustrating a structure of the heat sink of FIG. 3.

FIG. 4 is a sectional view for explaining a structure of the heat sink 40 of FIG. 3. The heat sink 40 illustrated in FIG. 4 includes at least one phase change material 44 injected into a capsule 42. The capsule 42 protects the phase change material 44 injected thereinto. The capsule 42 can be made of melanin resin.

The phase change material 44 includes any material having great latent heat so as to sufficiently absorb the heat from the lamp 16. The "latent heat" refers to a quantity of heat absorbed or released by a substance during a change of phase, such as during changing from a solid to a liquid, that occurs without a change in temperature. In the state of the latent heat, the phase change material absorbs external heat without raising the temperature. Preferably, the phase change material 44 includes alkanes hydrocarbons suitable for absorbing a lot of heat from the outside in the state of the latent heat.

The alkanes hydrocarbons have a melting point depending on the number of carbons constituting a molecule. The melting point of each alkanes hydrocarbon depending on the number of carbons are as in Table 1.

TABLE 1

| Name | Number of Carbons | Formula | Melting Point (° C.) |
| --- | --- | --- | --- |
| Hexadecane | 16 | $C_{16}H_{34}$ | 18 |
| Heptadecane | 17 | $C_{17}H_{36}$ | 22-24 |
| Octadecane | 18 | $C_{18}H_{38}$ | 28-31 |
| Nonadecane | 19 | $C_{19}H_{40}$ | 32-34 |
| Eicosane | 20 | $C_{20}H_{42}$ | 36-38 |
| Heneicosane | 21 | $C_{21}H_{44}$ | 39-43 |

On considering that the backlight unit 10 is typically used at room temperature, among the alkanes hydrocarbons in Table 1, some (e.g. hexadecane and hepadecane), which have the melting point corresponding to temperature less than and equal to the room temperature, do not have the substance state of the latent heat, and thus are not suitable for the phase change material of the heat sink 40. Further, some (e.g. eicosane and heneicosane), which have the melting point corresponding to excessively high temperature compared to the room temperature, absorb heat in the state in which the temperature of the lamp 16 and its surroundings is high, and thus make it difficult to have a heat absorption effect. The others (e.g. octadecane and nonadecone), which have the melting point corresponding to temperature (from about 27° C. to about 35° C.) higher than the room temperature and can obtain a heat absorption effect enough to inhibit the temperature of the lamp 16 and its surroundings, are most suitable for the phase change material of the heat sink 40. The heat sink 40 including the phase change material such as octadecane or nonadecane of the alkanes hydrocarbons sufficiently absorbs the heat from the lamp 16 within the temperature range from about 27° C. to about 35° C., and thereby inhibits the temperature of the lamp 16 and its surroundings within the temperature range from about 27° C. to about 35° C. As such, the characteristics of the reflection sheet 13, the light guide plate 14, the optical sheet set 15, and the liquid crystal panel 20 are prevented from being changed in part. Especially, the resistance characteristic of the metal material on the liquid crystal panel 20 is prevented from being changed. As a result, the surface light emitted from the backlight unit 10 becomes uniform and travels perpendicular to the rear surface of the liquid crystal panel. In addition, the inhibition of the temperature of the lamp 16 and its surrounds not only prevents the resistance characteristic of the metal in the liquid crystal panel from being changed, but also stabilizes the characteristics of the semiconductor device such as the transistor that is sensitive to the heat.

As described above, the backlight unit according to an embodiment of the present invention inhibits the temperature of the lamp 16 and its surrounds so as to be lower than a predetermined range of temperature using the lamp housing having the heat sink. Thus, the efficiency as well as the life span of the lamp can be increased. Further, the surface light emitted from the backlight unit can be made uniform, and travel perpendicular to the rear surface of the liquid crystal panel.

In addition, the inhibition of the temperature of the lamp 16 and its surrounds not only prevents the resistance characteristic of the metal in the liquid crystal panel from being changed, but also stabilizes the characteristics of the semiconductor device such as the transistor that is sensitive to the heat. The stabilization of the characteristics of the liquid crystal panel and the uniformity of the surface light can guarantee brightness uniformity of the image. As a result, the LCD can improve the quality of image.

Although the invention has been described with reference to specific embodiments, it will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight unit, comprising:
    a lamp emitting light to an incident light side of a light guide plate; and
    a lamp housing partially surrounding the lamp and including a heat sink,
    wherein the heat sink is disposed in the inside of the lamp housing, and
    wherein the heat sink includes at least one phase change material and a plurality of capsules for encapsulating for the phase change material.
2. The backlight unit as claimed in claim 1, wherein the phase change material is selected from alkanes hydrocarbons.
3. The backlight unit as claimed in claim 1, wherein the phase change material includes at least one of octadecane and nonadecane belonging to alkanes hydrocarbons.
4. The backlight unit as claimed in claim 1, wherein the capsule is formed of melanin resin.
5. A liquid crystal display, comprising:
    a liquid crystal panel; and
    a backlight unit including a light guide plate that guides light from a lamp to the liquid crystal panel, and a lamp housing partially surrounding the lamp and including a heat sink,
    wherein the heat sink is disposed in the inside of the lamp housing, and
    wherein the heat sink includes at least one phase change material and a plurality of capsule for encapsulating the phase change material.
6. The liquid crystal display as claimed in claim 5, wherein the phase change material is selected from alkanes hydrocarbons.
7. The liquid crystal display as claimed in claim 5, wherein the phase change material includes at least one of octadecane and nonadecane belonging to alkanes hydrocarbons.
8. The liquid crystal display as claimed in claim 5, wherein the capsule is formed of melanin resin.

* * * * *